(12) United States Patent
Chadbourne

(10) Patent No.: US 10,915,947 B2
(45) Date of Patent: Feb. 9, 2021

(54) DIGITAL MEDIA LENDING SYSTEM AND METHOD

(71) Applicant: Bibliotheca Limited, Stockport (GB)

(72) Inventor: Andrew Chadbourne, Stockport (GB)

(73) Assignee: Bibliotheca Limited, Stockport (GB)

( * ) Notice: Subject to any disclaimer, the term of this patent is extended or adjusted under 35 U.S.C. 154(b) by 191 days.

(21) Appl. No.: 15/597,934

(22) Filed: May 17, 2017

(65) Prior Publication Data

US 2017/0323379 A1 Nov. 9, 2017

Related U.S. Application Data

(63) Continuation of application No. 14/196,903, filed on Mar. 4, 2014, now abandoned.

(30) Foreign Application Priority Data

Mar. 5, 2013 (GB) .................................. 1303945.8

(51) Int. Cl.
*G06Q 20/06* (2012.01)
*G06Q 30/06* (2012.01)
*G06F 21/10* (2013.01)
*G06Q 30/00* (2012.01)

(52) U.S. Cl.
CPC ......... *G06Q 30/0645* (2013.01); *G06F 21/10* (2013.01); *G06Q 30/018* (2013.01)

(58) Field of Classification Search
USPC ....................................................... 705/307
See application file for complete search history.

(56) References Cited

U.S. PATENT DOCUMENTS

| 5,777,884 A | * | 7/1998 | Belka | .................. G06Q 10/087 206/387.11 |
| 2010/0030578 A1 | * | 2/2010 | Siddique | ............... G06Q 40/12 705/3 |
| 2012/0311727 A1 | * | 12/2012 | Stefik | ..................... G06F 21/10 726/30 |

FOREIGN PATENT DOCUMENTS

WO WO-2013192192 A2 * 12/2013 ............. G06Q 30/06

OTHER PUBLICATIONS

Pinoytutorial Techtorial, Modern Warfare 3: Reviews and User Score Anomaly, Nov. 9, 2011, pp. 1-7 (Year: 2011).*
Disclosed Anonymously, Method for Social Lending of Digital Media via DRM, Dec. 21, 2010, IP.com Prior Art Database Technical Disclosure, IP.com No. IPCOM000202536D (Year: 2010).*

* cited by examiner

*Primary Examiner* — Minnah L Seoh
*Assistant Examiner* — Michael Young
(74) *Attorney, Agent, or Firm* — Leason Ellis LLP

(57) ABSTRACT

A digital media lending system and computer implemented method is disclosed. The system includes a usage restriction system operable to apply usage restrictions to digital media items and a user interface arranged to receive a user input by a user requesting loan of a digital media item. The usage restriction system is arranged to apply usage restrictions to the requested digital media item in dependence on historic activities of the user.

20 Claims, 3 Drawing Sheets

DIGITAL MEDIA LENDING SYSTEM AND METHOD

This patent application claims the benefit of priority under 35 U.S.C. § 119(a) of Great Britain Application Serial No. 1303945.8, filed Mar. 5, 2013, entitled "Digital Media Lending System and Method," which is hereby incorporated by reference in its entirety.

FIELD OF THE INVENTION

The present invention relates to a system and method for supporting lending of digital media and is particularly applicable for use in providing a library with a mechanism to lend media such as electronic books.

BACKGROUND OF THE INVENTION

When a patron wants to a borrow a book or periodical he or she visits a library, finds the physical media in question and goes through a check-out procedure to take it home to read and subsequently return.

Electronic access to digital material is available at some libraries. Sometimes, the patron is required to view the digital material from a network computer within a library, much in the way that archived material used to have been viewed for many years on microfiche and the like.

While it is currently possible for libraries to lend electronic books (or 'eBooks') to patrons via a website, accessible internally and/or externally of the physical library, this process can be complicated for people who are not computer savvy (requiring various software to be downloaded and installed).

Currently there are a number of systems that allow the libraries to loan eBooks to patrons. These systems may be in-library (typically through the use of a dedicated browsing kiosk) or online accessible from the patron's home or mobile device. However, there exists a level of anxiety from eBook publishers, who are nervous that allowing patrons to easily rent books at home will ultimately damage revenues for both them and their retail partners.

Currently, libraries must purchase eBooks using the same rental model applied to physical books—i.e. one eBook for each loan. This means that once an eBook is loaned to one person it is not available to anyone else until the loan expires. This can cause confusion for patrons who can see titles online but are not able to borrow them.

Particularly as more and more publications are published only electronically, it is highly desirable for libraries to offer lending of eBooks and similar electronic media.

To combat the above fear, publishers currently either a) charge a huge premium to cover loss of sales (often 200-300% above physical book pricing) or, more commonly, b) do not make titles available to the library at all.

Libraries not only resent the inability to loan books to their patrons, but equally often cannot afford the high charges imposed through the use of current eBook lending models.

SUMMARY OF THE INVENTION

According to an aspect of the present invention, there is provided a digital media lending system comprising:

a usage restriction system operable to apply usage restrictions to digital media items; and a user interface arranged to receive a user input by a user requesting loan of a digital media item, wherein the usage restriction system is arranged to apply usage restrictions to the requested digital media item in dependence on historic activities of the user.

The digital media lending system may further comprise a data repository encoding data on historic activities of a user, the usage restriction system being arranged to apply said usage restrictions in dependence on data in said repository on the user.

The data repository may comprise a library management system encoding data on a user's physical and digital media loan activities over time.

Historic activities of the user may include one or more of: visiting the library; logging on to the library's website; borrowing physical titles from the library; attending a class at the library; downloading 'publisher recommended' eBook titles; entering a publisher-run competition; using a self-service machine/kiosk in the library; using in-library PC facilities; and paying bills using the systems in the library.

At least selected ones of the digital media items may be stored remotely of the digital media lending system, the digital media lending system being arranged to cause a requested digital media item that is stored remotely to have said usage restrictions applied and to be communicated to the user.

The digital media lending system may be arranged to retrieve a requested remotely stored digital media item for application of the usage restrictions by the usage restriction system prior to communication to the user.

The usage restriction system may be arranged to communicate said usage restrictions to a remote source for application to the requested digital media item.

The usage restrictions may include one or more selected from a set including:

requiring direct connection of an e-reader to a terminal of the digital media lending system to download the digital media item; prohibit downloading from outside the premises of a library providing the digital media lending system; expiring loans after a predetermined period; interleaving adverts in the digital media item.

The digital media lending system may be arranged to encode the usage restrictions within one of: the digital media item; the content of the digital media item; and a file associated with the digital media item, the file being operable to cause application of the usage restrictions in the user's e-reader device.

The historic activities of the user may be used to compute a score, the digital media lending system being arranged to cause the score to decay over time, wherein the usage restriction system is arranged to apply the usage restrictions in dependence on the user's score.

The digital media lending system may further comprise a user interface arranged to display an illustration of current and possible usage restrictions to the user.

The user interface may include an illustration of a barometer, the user's progression along the barometer reflecting the user's score.

The usage restriction system may be arranged to modify the severity of usage restrictions applied in dependence on the user's score.

The usage restrictions may include one or more of:

requiring a direct connection of an e-reader to a terminal of the digital media lending system to download the digital media item, the usage restriction being modified by varying a frequency of loan items out of overall loaned digital media items for which a direct connection is required;

allowing extension of loans, the usage restriction being modified by varying the number of extensions permitted;

loan period, the usage restriction being modified by varying the loan period;

number of adverts, the usage restriction being modified by varying the number of adverts; and concurrent loans, the usage restriction being modified by varying the number of concurrent loans.

In a preferred embodiment, a self-service kiosk may include or interface with the above described digital media lending system, the self-service kiosk including a communication interface for communicating a loaned digital media item to a user's e-reader. In another embodiment, the digital media lending system may be part of, or operate through, a website. The website may be accessible via the world-wide-web or it may be accessible only to physical visitors to a library or other facility.

According to another aspect of the present invention, there is provided a computer implemented method of lending digital media items comprising:

monitoring predetermined activity types of users and recording data on said monitored activities in a data repository;

receiving, at a user interface, a user input by a user requesting loan of a digital media item;

prior to lending the digital media item to the user, applying usage restrictions to the digital media item in dependence on historic activities of the user in said data repository.

The data repository may comprise a library system encoding data on a user's physical and digital media loan activities over time, the predetermined activity types include one or more of:

visiting the library; logging on to the library's website; borrowing physical titles from the library; attending a class at the library; downloading 'publisher recommended' eBook titles; entering a publisher-run competition; using a self-service machine/kiosk in the library; using in-library PC facilities; and paying bills using the systems in the library.

The usage restrictions may include one or more selected from a set including: requiring direct connection of an e-reader to a terminal of the digital media lending system to download the digital media item; prohibit downloading from outside the premises of a library providing the digital media lending system; expiring loans after a predetermined period; interleaving adverts in the digital media item.

The method may further comprise a user interface arranged to display an illustration of current and possible usage restrictions to the user.

The method may further comprise:

computing a score from the historic activities of the user; and modifying the severity of usage restrictions applied in dependence on the user's score.

In one embodiment, a digital media lending system comprises a digital media loan system arranged to apply usage restrictions to a digital media item to be loaned in dependence on a monitored history of the user seeking the loan, wherein the usage restrictions are arranged to cause limitations in the use of the digital media item by the user. Preferably, the usage restrictions are selected from a scale of restrictions, the position of the scale being dependent on activities over time by said user in said monitored history.

In one embodiment, a system is arranged to record frequencies of one or more activities performed by a patron in person or by his or her representative at a library. A check-out terminal such as a kiosk or an online system such as a web access portal is arranged to apply usage restrictions to digital media lent to the patron in dependence on the recorded frequencies of activities.

The check-out terminal can optionally link to library databases and/or a local or remote eBook aggregation platform to seamlessly add the loan to the patron account and cause download of the e-content to the patron's device.

Embodiments of the present invention seek to provide systems and methods in which eBook material access is controlled so as to be accessible to users meeting predetermined criteria. For example, the system may be arranged to allow access only to 'true' library users—i.e. those that would also, or previously, visit and rent physical book material from the library. In one embodiment, a 'convenience barometer' is implemented (either logically by components of the libraries' system or logically and visually via a user interface). In one example, a system tracks the in person physical usage behaviour of a patron in the library and awards them a 'score' based on frequency of visit and/or lending physical books and other media that allows them to rent various levels of eBooks.

Preferred embodiments monitor library patron activities in order to give them a rating of how effective as user they are and rewards "effective" patrons by reducing inconvenience in eBook borrowing, for example increasing number allowed to borrow, loan time, allowing home downloads, or removing adverts.

BRIEF DESCRIPTION OF THE DRAWINGS

Embodiments of the present invention will now by described by way of example only with reference to the accompanying drawing, in which.

DETAILED DESCRIPTION OF CERTAIN EMBODIMENTS OF THE INVENTION

Figure 1:
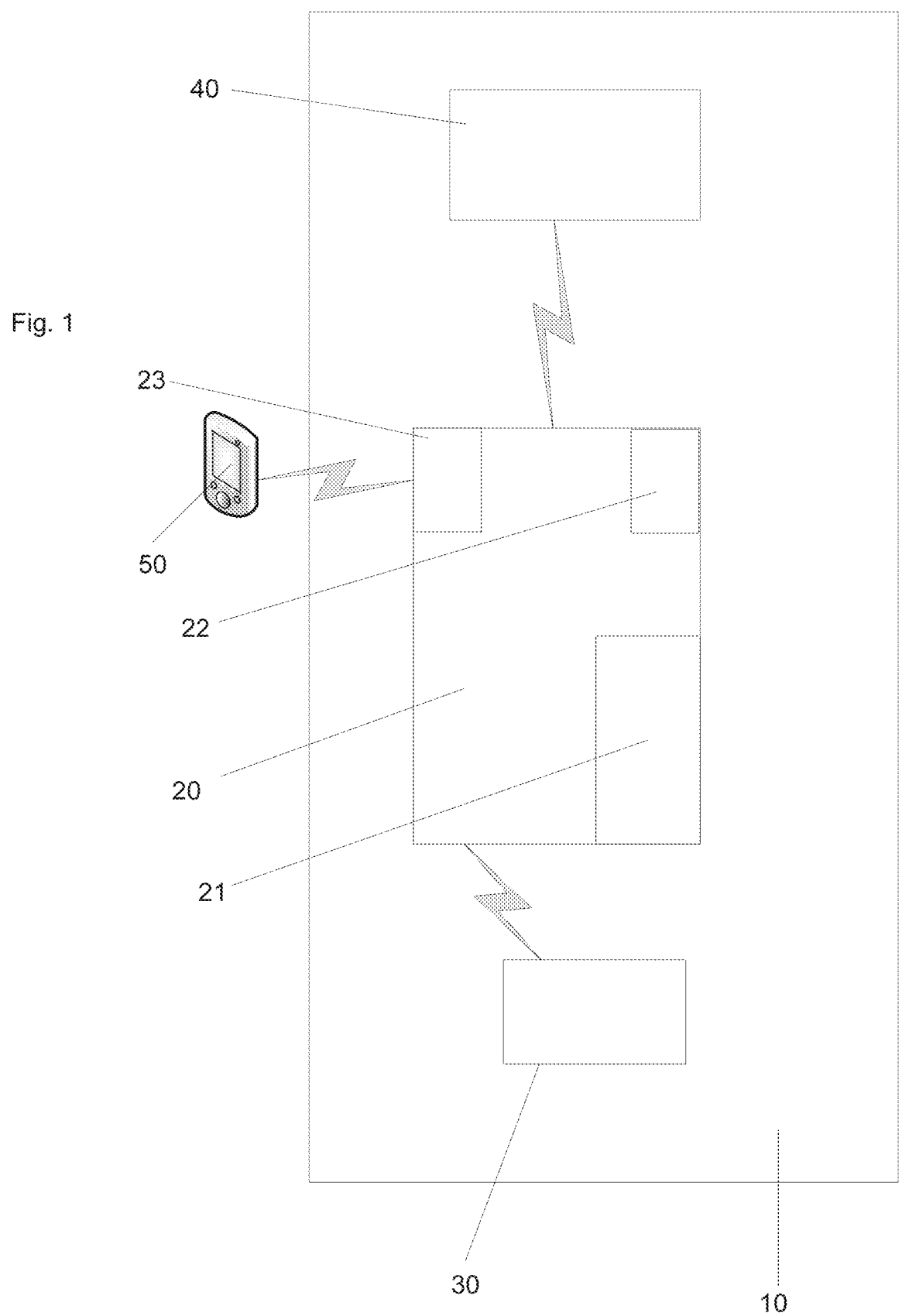
FIG. 1 is a schematic diagram of a system according to an embodiment of the present invention.

FIG. 1 is a schematic diagram illustrating components of a system 10 for lending electronic media items to a visitor of a library.

The system 10 includes a check-out terminal 20 and a data repository 30.

The data repository 30 encodes one or more versions of eBooks as discussed in more detail below. The system 10 also includes a user database 40 having a record for each registered user.

The check-out terminal 20 is installed at the library and is used to check-out books and other media so that the patron may take them home to read/consume. Check-out terminals vary in form factor and in the mechanism used to check out books. They can scan barcodes, RFID tags or other identifiers on items using bar code readers, RFID tag readers, or use other technology that is configured to identify the items being presented. Each item presented is associated (for instance, in digital memory or a database) with the patron's account with the library and loans of the books may be subject to limits on total number of items to be lent to an individual, whether there are items overdue for return, whether fines imposed for late returns have been paid etc.

More generally, the functions of the terminal 20 are implemented by a processor configured by code executing in the processor. The code can be arranged into modules that correspond to the various functions.

The check-out terminal 20 may be a self-service type terminal or it may be operated by a member of the library staff. As the patron checks out books and other physical media, the loan is recorded against his or her account in the user database 40. Additionally, an eBook access score is incremented in the database 40 as a representation of usage of the physical library facilities.

It will be appreciated that various ways of managing and incrementing the score can be envisaged. Frequencies of individual acts could be recorded separately and each awarded a value or the activities themselves may be ignored and just rated to determine a value which is added to a counter for the user. Details of possible scored activities are discussed below.

It will be appreciated that the eBook access score could be affected by systems other than check-out terminals such as staff stations, access gates (where visits to the facilities are controlled and a user must present credentials to enter, for example), existing library systems and databases such as the Integrated Library System/Library Management System (which may be the user database 40 or may be a separate system).

Figure 2:
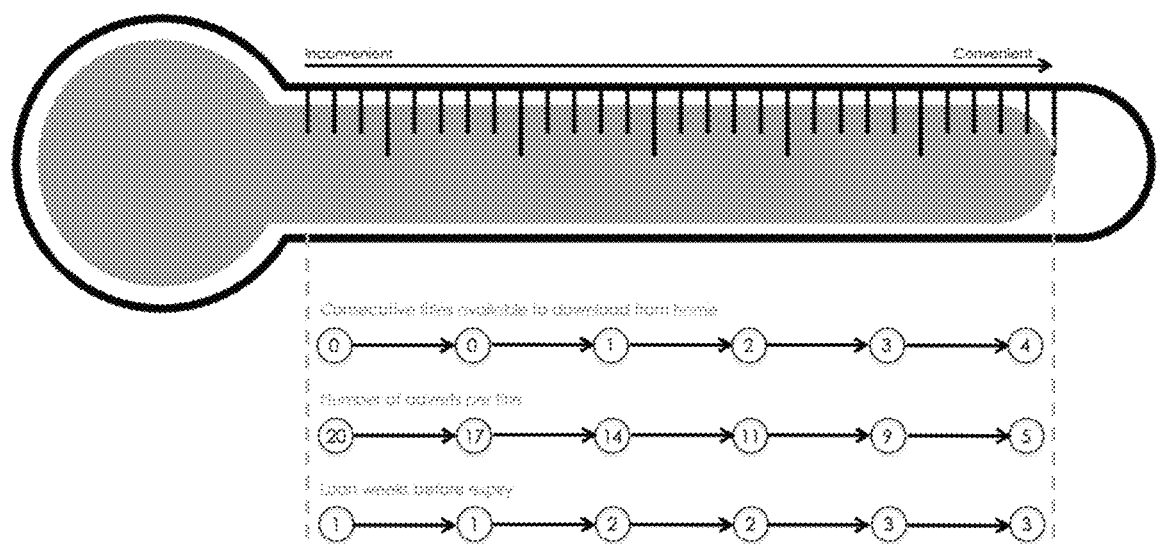
FIG. 2 is an illustration of aspects of a user interface according to one embodiment.

The check-out terminal 20, in addition to allowing checking out conventional books and other items to a patron, includes a display 21 in which a user interface is displayed. Optionally, the check-out terminal 20 includes a user interface unit 22 which may be a keyboard, touchscreen or the like. An example of the user interface is illustrated in FIG. 2.

Upon accessing the check-out terminal 20 and identifying themselves, a patron provides information (such as a username, barcoded or RFID tagged membership card) from which the check-out terminal 20 can determine the patron's account.

Should the patron request to borrow an eBook, for example by using the user interface unit 22, the check-out terminal accesses the user database 40 to retrieve data on the patron and, in particular, data defining the eBook access score which is translated into a visual representation and displayed on-screen on the display 21. An example visual representation is shown in FIG. 2, although it will be appreciated that other representations could be used such as illuminated lights, vertical scales, series' of ticks, check boxes or the like.

The visual representation is linked to one or more eBook attributes that are applied by the system 10 when the patron borrows an eBook as is discussed in detail below.

The patron selects the eBook of interest, for example using the display 21 and user interface unit 22, and the check-out terminal 20 accesses the data repository 30 to retrieve the eBook. The attributes are applied to the eBook as discussed below and the eBook is then provided to the patron.

For example, the check-out terminal 20 may cause the eBook to be communicated to a digital media reader device 50 of the patron or sent to their online account for download at a later time, perhaps in their own home.

In a preferred embodiment, the check-out terminal (also known as a kiosk) 20 includes a communications module 23 for communicating with the digital media reader device 50 of the patron. The communications module 23 may include a cable and connector to interface to the digital media reader device 50 such as by a USB type connection. Alternatively or in addition, the communications module 23 may include a wireless transceiver for wirelessly communicating with the digital media reader device 50 of the patron, by protocols and mechanisms such as WiFi, BlueTooth or the like. In another alternative, the communications module 23 may include a wired network connection to a network via which the digital media reader device 50 can be reached.

In one embodiment, the communications module 23 interfaces the check-out terminal 20 with a library-wide wireless network, to which the patron's digital media reading device may be given access. In this embodiment, when the eBook is to be communicated to the digital media reader device 50 of the patron, it is pushed (such as with the communications module initiating a connection) to the digital media reader device 50 over the network or it may be indicated as being available for download to the digital media reader device 50 when the device 50 next connects to the network or next checks for downloads. Optionally, the network may extend beyond the physical boundaries of the library and may be remotely accessible by the patron and/or patron device 50.

In one embodiment, power of the wireless communication system for the communications module 23 is controlled or set such that it can communicate only with digital media reader devices 50 that are in the local proximity (approximately 0-5 m) of the library perimeter or of the check-out terminal 20.

The library may require the patron's digital media reading device 50 to be registered in order to receive loaned eBooks (in which case, the digitally readable version of the item may include a license, cryptographic key or similar that prevents devices other than that registered from reading/consuming the item).

As part of the checkout process, a database of the library holding data on items loaned to the patron is updated to reflect the loaned digitally readable media item and optionally limit the number of loaned digitally readable media items to the patron to a predetermined number. A background process is also preferably operated by the library to clear the loan records for digitally readable media items once the loan period has expired.

In an alternate embodiment, a patron instead of connecting his or her eBook reading device to the check-out terminal 20, may instead log on to a remote system in order to borrow and download an eBook remotely, such as from home. In such an embodiment, once the loan of the eBook has been approved by the remote system, the patron can download the eBook immediately or alternatively have the eBook delivered or made available to an online account for download later.

At least aspects of the illustrative embodiments can take the form of a computer program product accessible from a non-transitory computer-usable or computer-readable medium providing program code for use by, or in connection with, a computer or any instruction execution system. For the purposes of this description, a computer-usable or computer readable medium can be any non-transitory recordable-type tangible apparatus that can contain, store, communicate, propagate, or transport the program for use by or in connection with the instruction execution system, apparatus, or device.

It will be appreciated that the principles of the present invention could be applied to other media and form factors with electronic versions of magazines, CD's, DVDs and the like being made available in a similar manner.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

FIG. 2 provides an illustration of one possible implementation. Patrons would all start with the barometer empty (left-hand side). As they progress along the scale, lending attributes associated with eBooks (and possibly other loans) may be changed, activated or deactivated. For example, with the barometer empty, attributes may:

require direct connection of an e-reader to download an eBook;
prohibit download from home;
expire loans after 1 week;
Interleave adverts every 1 page As the patron progresses along the scale, attributes may be changed to relax the lending conditions, for example:

only requiring direct connection every n loans (and Wifi or home loan at other times);
allowing extension of loans;
setting longer loan periods;
reducing number of adverts;
allowing multiple concurrent loans.

The far-right of the scale (barometer full) in the illustrated embodiment means that they can now download up to 4 titles, with minimal adverts and each loan expires after 4 weeks.

Patrons using the library are awarded points for each transaction they perform in the library or that is agreed between the library and book publishers. Each point moves the scale from the left to the right—decreasing their inconvenience. Common actions that would 'award' point may include (amongst others):

Borrowing physical titles from the library;
Attending a class at the library;
Downloading 'publisher recommended' eBook titles;
Entering a publisher-run competition;
Using a self-service machine/kiosk in the library;
Using in-library PC facilities;
Paying bills using the systems in the library.

In order to make sure that patrons don't simply join the library and borrow some items in order to gain access to digital e-content, the barometer scale may either:

a) reset to left after a pre-defined period of time, or
b) begin to fall on a daily basis back to the zero position.

Figure 3:
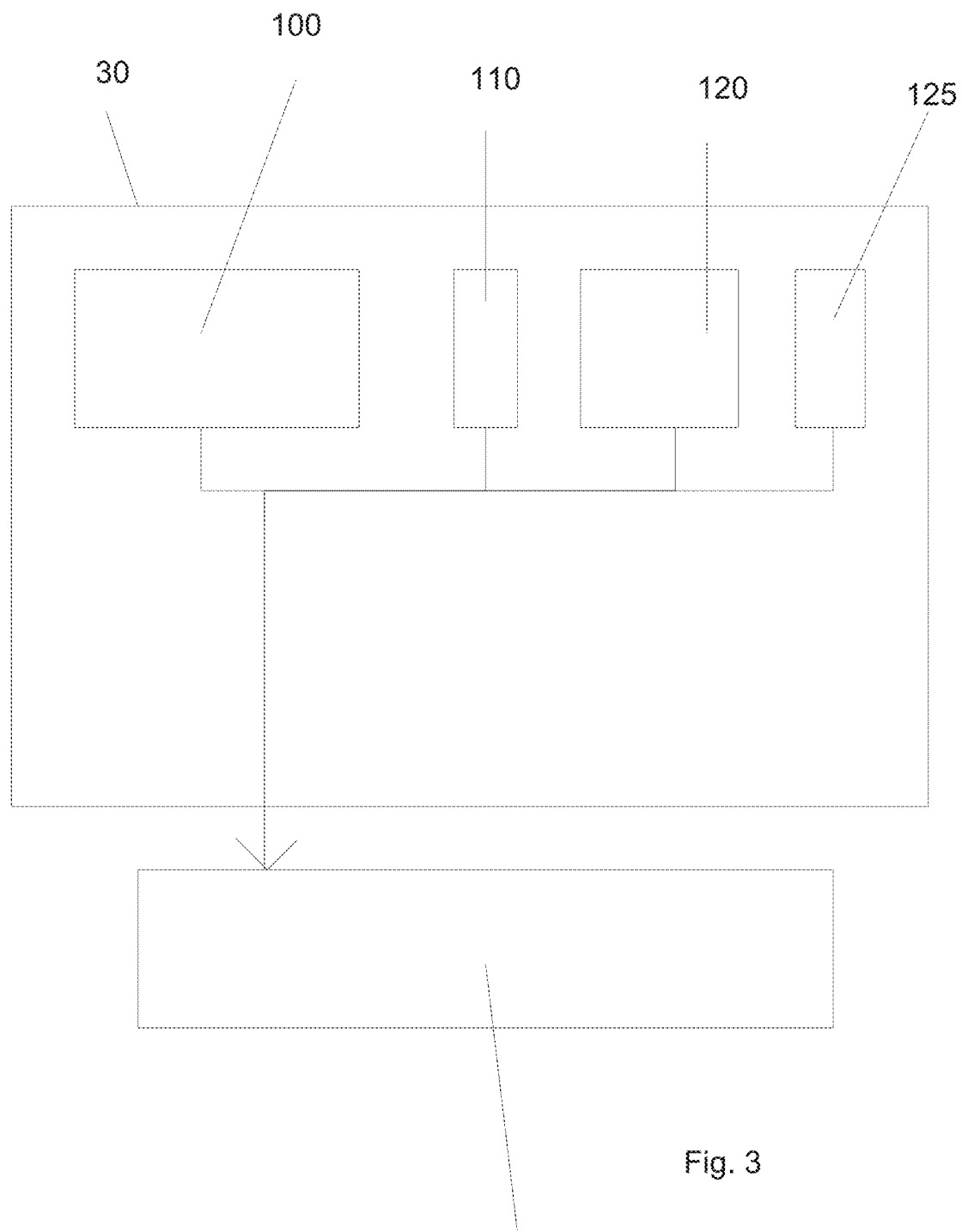
FIG. 3 is a schematic diagram illustrating compilation of an eBook according to usage attributes according to an embodiment.

FIG. 3 is a schematic diagram illustrating compilation of an eBook subject to usage attributes.

In one embodiment, the eBook is stored in the data repository 30 in a precompiled state. Upon a patron requesting loan of the eBook, the precompiled eBook 100 is obtained from the data repository combined in an eBook data file 150 with metadata 110 defining, for example, usage restrictions such as expiry date, account to which the eBook is being loaned, origin (the library), authentication data (such as a cryptographic hash of other data in the metadata to prevent tampering). Data defining advertisements 120 and metadata 125 defining their placement in the eBook is also added to the eBook data file 150 (optionally it may be added to and become part of the actual precompiled eBook 100).

The eBook data file 150 is then ready for loan and disseminated to the patron in whatever manner is selected and permitted by the attributes.

It is to be appreciated that certain embodiments of the invention as discussed above may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

What is claimed is:

1. A digital media lending system comprising:
   a library management system including data repository encoding data on historic physical and digital media loan activities of a user over time,
   an in-library checkout terminal configured to record, in the data repository, physical media loaned to the user at the library, the in-library checkout terminal further including a physical interface to connect to an e-reader device of the user;
   the data repository further comprising a point score for the user, the digital media lending system being configured to increment the point score for the user upon detecting the user performing one of a predetermined set of in-library activities;
   a usage restriction system configured to apply usage restrictions to digital media items; and,
   a system accessible by the user when remote from the library and including a user interface arranged to receive a user input by the user via a user input device requesting loan and download of a digital media item,
   wherein the usage restriction system is arranged to apply usage restrictions to the requested digital media item in dependence on the point score of the user in the data repository comprising requiring direct connection of the e-reader via the physical interface to download the digital media item for a user having a point score at or over a first threshold and enabling the system accessible remotely from the library for a user having a point score at or over a second threshold,
   the second threshold being greater than the first threshold.

2. The digital media lending system of claim 1, wherein the predetermined set of in-library activities of the user include one or more of:
   visiting the library; logging on to the library's website; borrowing physical titles from the library;
   attending a class at the library; downloading 'publisher recommended' eBook titles; entering a publisher-run competition; using a self-service machine/kiosk in the library; using in-library PC facilities; and, paying bills using the systems in the library.

3. The digital media lending system of claim 1, wherein at least selected ones of the digital media items are stored remotely of the digital media lending system, the digital media lending system being arranged to cause a requested digital media item that is stored remotely to have said usage restrictions applied and to be communicated to the user.

4. The digital media lending system of claim 3, wherein the digital media lending system is arranged to retrieve a requested remotely stored digital media item for application of the usage restrictions by the usage restriction system prior to communication to the user.

5. The digital media lending system of claim 1, wherein the usage restriction system is arranged to communicate said usage restrictions to a remote source for application to the requested digital media item.

6. The digital media lending system of claim 1, wherein said usage restrictions include one or more selected from a set including:
   expiring loans after a predetermined period; and,
   interleaving adverts in the digital media item.

7. The digital media lending system of claim 1, wherein the digital media lending system is arranged to encode the usage restrictions within one of: the digital media item; the content of the digital media item; and, a file associated with the digital media item, the file being operable to cause application of the usage restrictions in the user's e-reader device.

8. The digital media lending system of claim 1, wherein the user interface is further arranged to display an illustration of current and possible usage restrictions to the user.

9. The digital media lending system of claim 8, wherein the user interface includes an illustration of a barometer, the user's progression along the barometer reflecting the user's score.

10. The digital media lending system of claim 1, wherein the usage restriction system is arranged to modify the severity of usage restrictions applied in dependence on the user's score.

11. The digital media lending system of claim 10, wherein the usage restrictions include one or more of:
   requiring a direct connection of an e-reader to a terminal of the digital media lending system to download the digital media item, the usage restriction being modified by varying a frequency of loan items out of overall loaned digital media items for which a direct connection is required;
   allowing extension of loans, the usage restriction being modified by varying the number of extensions permitted;
   loan period, the usage restriction being modified by varying the loan period;
   number of adverts, the usage restriction being modified by varying the number of adverts; and,
   concurrent loans, the usage restriction being modified by varying the number of concurrent loans.

12. A library lending system including:
   a library management system including data repository encoding data on historic physical and digital media loan activities of a user over time,
   the data repository further comprising a point score for the user, the library lending system being configured to increment the point score for the user upon detecting the user performing one of a predetermined set of in-library activities;
   a self-service kiosk including a user interface, a communication interface including a physical interface to connect to an e-reader device of the user and a processor configured to execute computer program code to for providing a digital media lending system, the computer program code including:
      computer program code configured to receive a user input by a user via the user interface requesting loan of a digital media item;
      computer program code configured, upon detecting the user's point score exceeds a predetermined threshold, to apply a usage restriction to the requested digital media items in dependence on the score of the user; and,
      computer program code to cause communication of the requested digital media item having the usage restriction via the physical interface to the user's e-reader.

13. A computer implemented method of lending digital media items comprising:
   storing, in a data repository of a library management system data on historic physical and digital media loan activities of a user over time,
   recording, in the data repository by an in-library checkout terminal, physical media loaned to the user at the library;
   recording, in the data repository, a point score for the user;
   incrementing the point score for the user upon detecting the user performing one of a predetermined set of in-library activities;
   receiving, at a user interface, a user input by a user requesting loan of a digital media item;
   prior to lending the digital media item to the user, applying usage restrictions to the digital media item in dependence on the score of the user in said data repository; and,
   providing the digital media item via a physical interface at the in-library checkout terminal if the user's point score is below a predetermined threshold and providing the digital media item via an online interface accessible remotely from the library if the user's point score is above a predetermined threshold.

14. The computer implemented method of claim 13, wherein the predetermined set of activities include one or more of:
   visiting the library; logging on to the library's website; borrowing physical titles from the library;
   attending a class at the library; downloading 'publisher recommended' eBook titles; entering a publisher-run competition; using a self-service machine/kiosk in the library; using in-library PC facilities; and, paying bills using the systems in the library.

15. The computer implemented method of claim 13, wherein said usage restrictions include one or more selected from a set including:
   expiring loans after a predetermined period;
   interleaving adverts in the digital media item.

16. The computer implemented method of claim 15, further comprising a user interface arranged to display an illustration of current and possible usage restrictions to the user.

17. The computer implemented method of claim 14, further comprising modifying the severity of usage restrictions applied in dependence on the user's score.

18. The digital media lending system of claim 1, wherein the digital media lending system is configured to cause the user's score in the data repository to decay over time.

19. The library lending system of claim 12, wherein the library lending system is configured to cause the user's score in the data repository to decay over time.

20. The computer implemented method of claim 13, further comprising decaying the user's score in the data repository over time.

* * * * *